(12) United States Patent
Whitehead et al.

(10) Patent No.: US 7,292,185 B2
(45) Date of Patent: Nov. 6, 2007

(54) ATTITUDE DETERMINATION EXPLOITING GEOMETRY CONSTRAINTS

(75) Inventors: Michael L. Whitehead, Scottsdale, AZ (US); Cary Davis, Cave Creek, AZ (US); Dale R. Scott, Calgary Alberta (CA)

(73) Assignee: CSI Wireless Inc., Calgary (CA)

( * ) Notice: Subject to any disclaimer, the term of this patent is extended or adjusted under 35 U.S.C. 154(b) by 116 days.

(21) Appl. No.: 11/243,112

(22) Filed: Oct. 4, 2005

(65) Prior Publication Data

US 2007/0075896 A1 Apr. 5, 2007

(51) Int. Cl.
*G01S 5/14* (2006.01)
(52) U.S. Cl. .............................. 342/357.11; 342/357.03; 342/357.04
(58) Field of Classification Search ............ 342/357.11
See application file for complete search history.

(56) References Cited

U.S. PATENT DOCUMENTS

| | | | |
|---|---|---|---|
| 5,296,861 A | 3/1994 | Knight | |
| 5,534,875 A | 7/1996 | Diefes et al. | |
| 5,543,804 A | 8/1996 | Buchler et al. | |
| 5,561,432 A | 10/1996 | Knight | |
| 5,617,317 A | 4/1997 | Ignagni | |
| 5,757,316 A | 5/1998 | Buchler | |
| 5,917,448 A | 6/1999 | Mickelson | |
| 5,933,110 A | 8/1999 | Tang | |
| 6,052,647 A * | 4/2000 | Parkinson et al. .......... 701/215 |
| 6,256,583 B1 | 7/2001 | Sutton | |
| 6,259,398 B1 | 7/2001 | Riley | |
| 6,313,788 B1 | 11/2001 | Wilson | |
| 6,421,003 B1 | 7/2002 | Riley et al. | |
| 6,587,761 B2 | 7/2003 | Kumar et al. | |
| 6,792,380 B2 | 9/2004 | Toda | |
| 7,026,982 B2 * | 4/2006 | Toda et al. ............ 342/357.04 |
| 7,027,918 B2 * | 4/2006 | Zimmerman et al. ....... 701/213 |
| 2004/0212533 A1 | 10/2004 | Whitehead | |
| 2005/0116859 A1 | 6/2005 | Miller | |

OTHER PUBLICATIONS

Lin, Dai et al, "Real Time Attitude Determination for Microsatellite by LAMBDA Method Combined with Kalman Filtering," 22nd AIAA International Communications Satellite Systems Conference and Exhibit Technical Papers, vol. 1, May 2004, pp. 136-143.*

(Continued)

*Primary Examiner*—Gregory C. Issing
(74) *Attorney, Agent, or Firm*—Mark E. Brown

(57) ABSTRACT

A method and system for determining at least one attitude angle of a rigid body. The method comprising: receiving a plurality of Global Navigation Satellite System (GNSS) satellite signals with a plurality of antennas; establishing at least one pair of antennas such that each antenna of the plurality of antennas is included in at least one antenna pair; computing single- or double-difference phases corresponding to one or more GNSS satellites for each of the pairs of antennas; and constructing a single Differential Carrier Phase Attitude (DCPA) equation based on known geometry constraints of each of the pairs of antennas. The method also includes determining a solution for the DCPA equation based on a cost function, the solution yielding at least one integer ambiguity value and the at least one attitude angle.

8 Claims, 12 Drawing Sheets

OTHER PUBLICATIONS

Xu, Jiangning et al, "An EHW Architecture for Real-time GPS Attitude Determination Based on Parallel Genetic Algorithm," Proc of the 2002 NASA/DOD Conf on Evolvable Hardware, 2002.*

Han, Shaowei et al, "Single-Epoch Ambiguity Resolution for Real-Time GPS Attitude Determination with the Aid of One Dimensional Optical Fiber Gyro," GPS Solutions vol. 3, No. 1, pp. 5-12 (1999). □□.*

Park, Chansik et al "Integer Ambiguity Resolution for GPS Based Attitude Determination System," SICE 1998, pp. 1115-1120.* http://www.patentstorm.us/class/342/357.11-Attitude_determination.html.

* cited by examiner

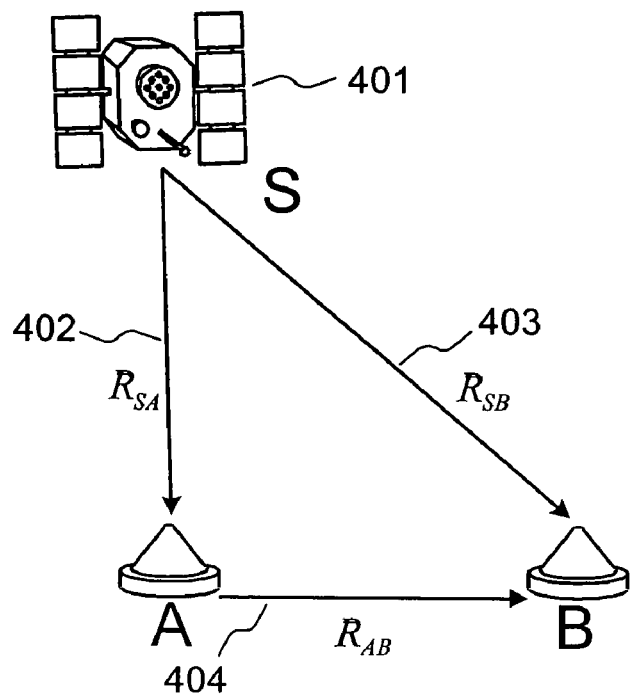
FIG. 4A
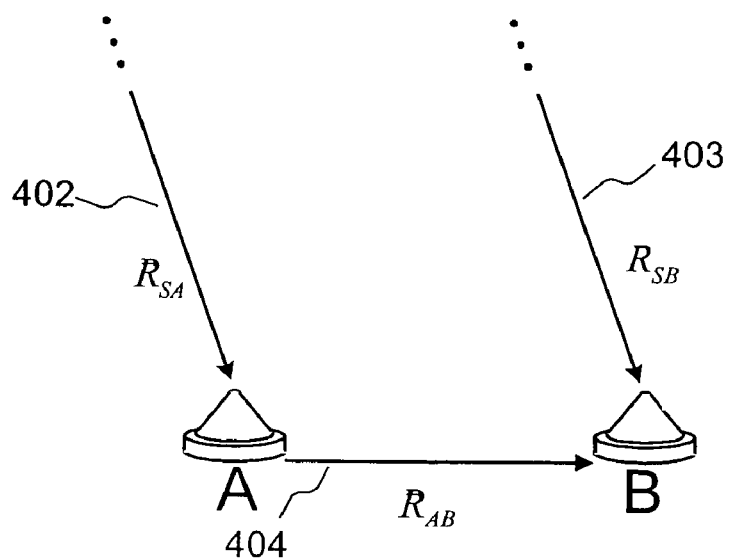
FIG. 4B
FIG. 4

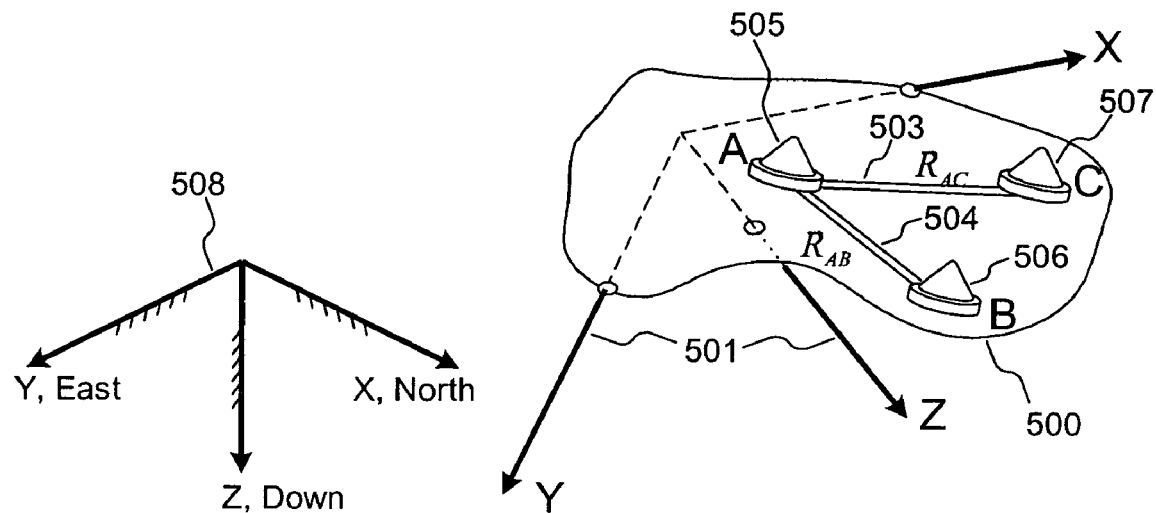
FIG. 5A
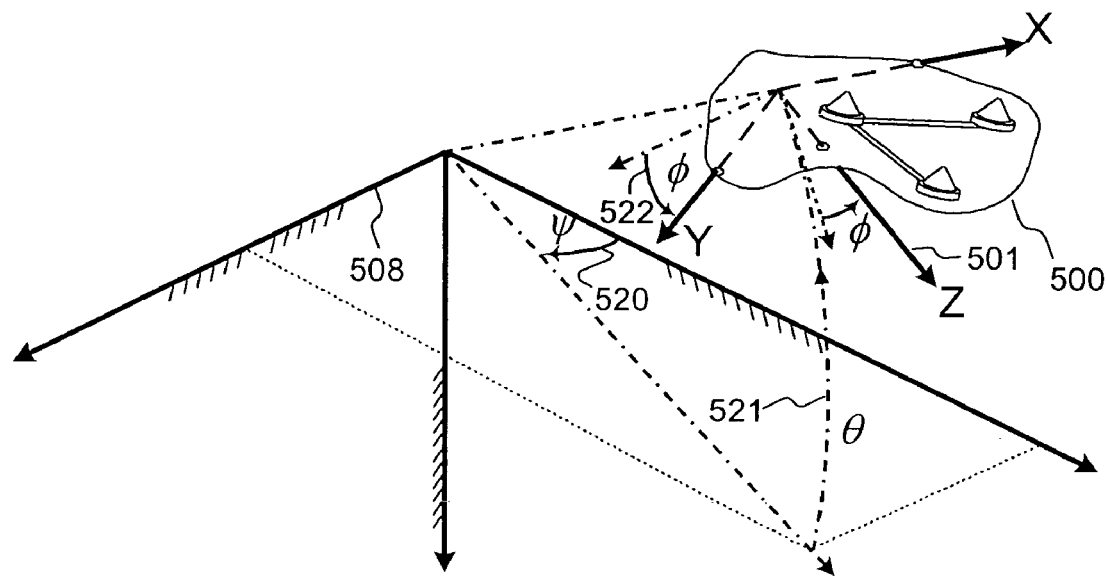
FIG. 5B
FIG. 5

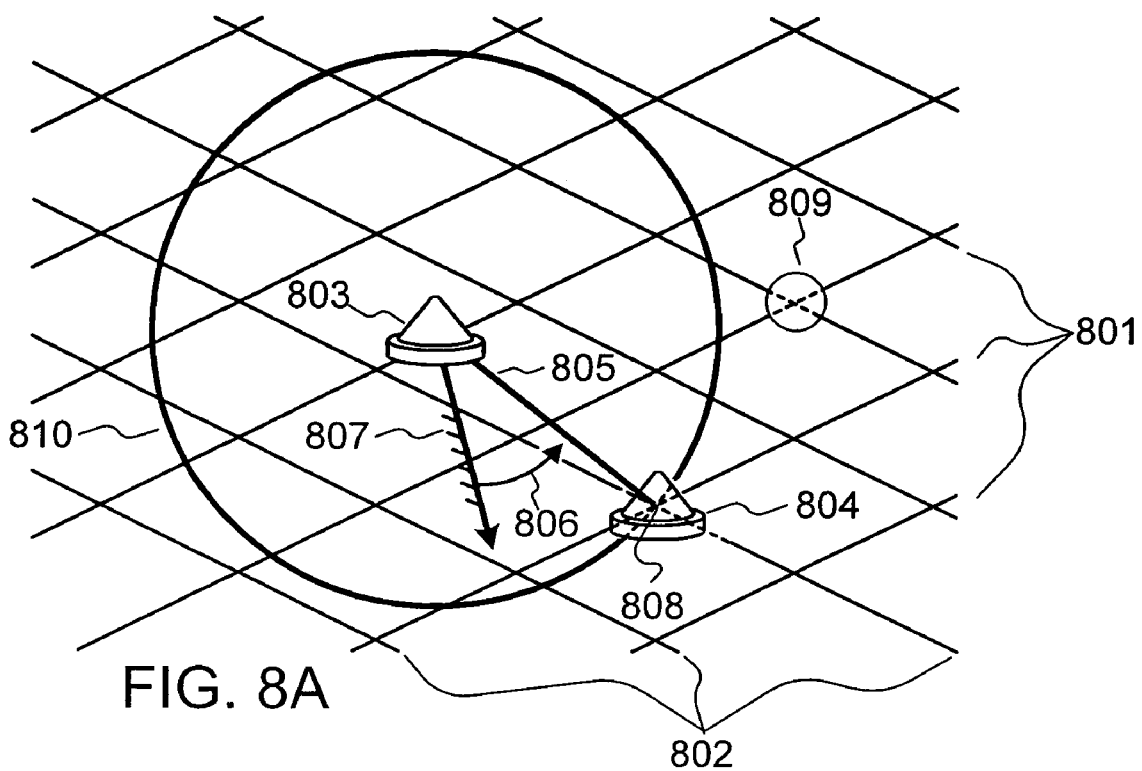
FIG. 8A
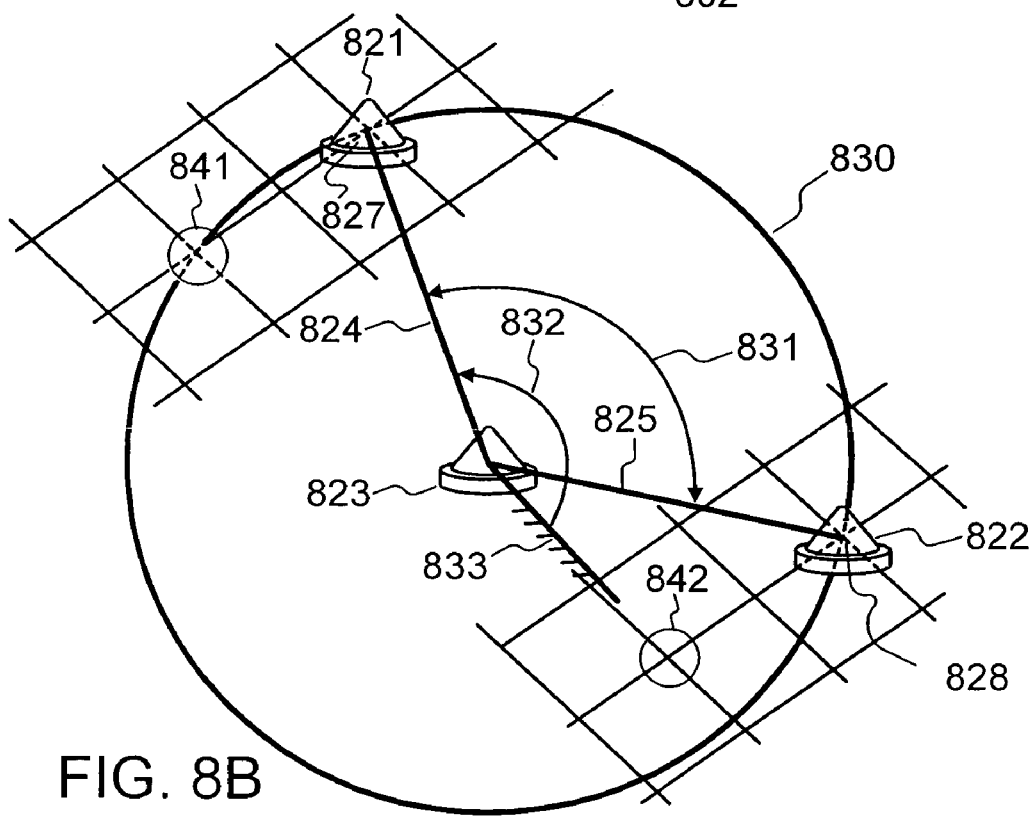
FIG. 8B
FIG. 8

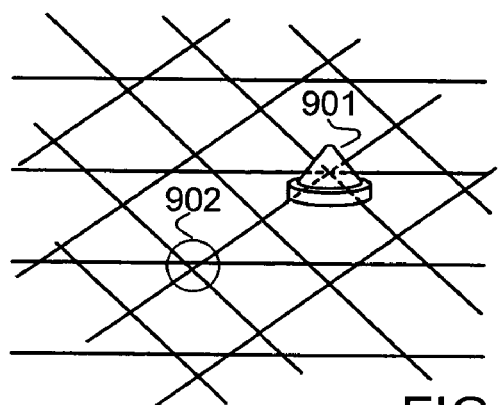
FIG. 9A
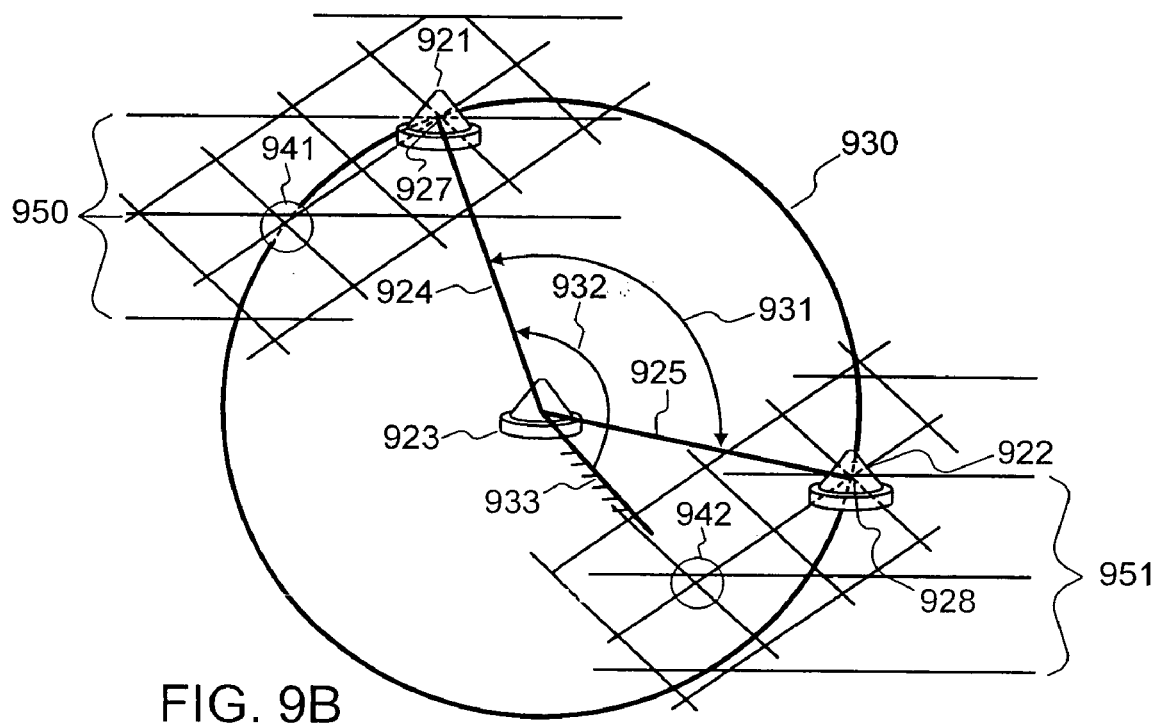
FIG. 9B
FIG. 9

ATTITUDE DETERMINATION EXPLOITING GEOMETRY CONSTRAINTS

FIELD OF THE INVENTION

The invention relates generally to precision attitude measuring systems. More specifically, the invention relates to systems that utilize Global Navigation Satellite System (GNSS) signals to infer differential path length of carrier signals arriving at two or more antennas to ultimately determine attitude.

BACKGROUND OF THE INVENTION

The determination of the orientation of an object's axes relative to a reference system is often of interest. Depending on the application, the orientation and reference system may be in two dimensions (2D) or in three dimensions (3D). In the case of two-dimensional systems, terms such as azimuth, heading, elevation, pitch, and inclination may be used in place of attitude.

There are many techniques in use to measure 2D and 3D attitude. Common techniques include using a magnetic compass to reference the object of interest to the local gravitational field, optical techniques to reference the object of interest to an earth-based or star-based reference frame, accelerometers to measure relative attitude or changes in attitude, and optical and mechanical gyroscopes for also measuring relative attitude. The merits of each technique are best judged according to the specific application or use. Likewise, each technique also exhibits disadvantages that may include accuracy, cost, and ease of use.

Recently, attitude determination using highly accurate space-based radio navigation systems has become possible. Such a radio navigation system is commonly referred to as a Global Navigation Satellite System (GNSS). A GNSS includes a network of satellites that broadcast radio signals, enabling a user to determine the location of a receiving antenna with a high degree of accuracy. To determine the attitude of an object, it is simply necessary to determine the position of two or more receiving antennas that have known placements relative to an object. Examples of GNSS systems include Navstar Global Positioning System (GPS), established by the United States; Globalnaya Navigatsionnay Sputnikovaya Sistema, or Global Orbiting Navigation Satellite System (GLONASS), established by the Russian Federation and similar in concept to GPS; and Galileo, also similar to GPS but created by the European Community and slated for full operational capacity in 2008.

Should it be necessary to improve the accuracy, reliability, or confidence level of an attitude or position determined through use of a GNSS, a Satellite-Based Augmentation System (SBAS) may be incorporated if one that is suitable is available. There are several public SBAS that work with GPS. These include Wide Area Augmentation System (WAAS), developed by the United States' Federal Aviation Authority, European Geostationary Navigation Overlay Service (EGNOS), developed by the European Community, as well as other public and private pay-for-service systems.

Currently the best-known of the available GNSS, GPS was developed by the United States government and has a constellation of 24 satellites in 6 orbital planes at an altitude of approximately 26,500 km. The first satellite was launched in February 1978. Initial Operational Capability (IOC) for the GPS was declared in December 1993. Each satellite continuously transmits microwave L-band radio signals in two frequency bands, L1 (1575.42 MHz) and L2 (1227.6 MHz). The L1 and L2 signals are phase shifted, or modulated, by one or more binary codes. These binary codes provide timing patterns relative to the satellite's onboard precision clock (synchronized to other satellites and to a ground reference through a ground-based control segment), in addition to a navigation message giving the precise orbital position of each satellite, clock correction information, and other system parameters.

The binary codes providing the timing information are called the C/A Code, or coarse acquisition code, and the P-code, or precise code. The C/A Code is a 1 MHz Pseudo Random Noise (PRN) code modulating the phase of the L1 signal, and repeating every 1023 bits (one millisecond). The P-Code is also a PRN code, but modulates the phase of both the L1 and L2 signals, and is a 10 MHz code repeating every seven days. These PRN codes are known patterns that can be compared to internal versions in the receiver. The GNSS receiver is able to compute an unambiguous range to each satellite by determining the time-shift necessary to align the internal code to the broadcast code. Since both the C/A Code and the P-Code have a relatively long "wavelength"—approximately 300 meters (or 1 microsecond) for the C/A Code, and 30 meters (or 1/10 microsecond) for the P-Code, positions computed using them have a relatively coarse level of resolution.

To improve the positional accuracy provided by use of the C/A Code and the P-Code, a receiver may take advantage of the carrier component of the L1 or L2 signal. The term "carrier", as used herein, refers to the dominant spectral component remaining in the radio signal after the spectral content resulting from the modulating PRN digital codes has been removed (e.g., from the C/A Code and the P-Code). The L1 and L2 carrier signals have wavelengths of about 19 centimeters and 24 centimeters, respectively. The GPS receiver is able to track these carrier signals and measure the carrier phase to a small fraction of a complete wavelength, permitting range measurement to an accuracy of less than a centimeter.

A final technique to improve accuracy, and which shall be seen to be of key interest here, is the technique of differencing GPS range measurements—known as Differential GPS (DGPS). The combination of DGPS with precise measurements of carrier phase leads to differential position accuracies of less than one centimeter root-mean-squared (i.e., centimeter-level positioning). Such accuracies are sufficient to determine the attitude of an object with 2 or more GPS GNSS antennas, typically spaced from 0.2 meters to 2 meters apart.

Therefore, what is needed in the art is a system that utilizes Global Navigation Satellite System (GNSS) signals to infer differential path length of carrier signals arriving at two or more antennas to ultimately determine attitude while leveraging the advantages of geometry constraints of the antennas attached to a rigid body, and does so with measurements from all antennas processed simultaneously and optimally.

SUMMARY OF THE INVENTION

An exemplary embodiment of the invention features a method of attitude determination that is effective and completely exploits geometry constraints of the antennas attached to a rigid body, and preferably does so with measurements from all antennas processed simultaneously and optimally. This occurs both during the solution of the ambiguities and during normal operation of the attitude device.

Disclosed herein in an exemplary embodiment is a method for determining at least one attitude angle of a rigid body. The method comprising: receiving a plurality of Global Navigation Satellite System (GNSS) satellite signals with a plurality of antennas; establishing at least one pair of antennas such that each antenna of the plurality of antennas is included in at least one antenna pair; computing single- or double-difference phases corresponding to one or more GNSS satellites for each of the pairs of antennas; and constructing a single Differential Carrier Phase Attitude (DCPA) equation based on known geometry constraints of each of the pairs of antennas. The method also includes determining a solution for the DCPA equation based on a cost function, the solution yielding at least one integer ambiguity value and the at least one attitude angle.

Also disclosed herein in an exemplary embodiment is a system for determining at least one attitude angle of a rigid body. The system comprising: a plurality of antennas disposed on the rigid body, the plurality of antennas exhibiting known relative geometries and receptive to a plurality of Global Navigation Satellite System (GNSS) satellite signals. The plurality antennas partitioned into at least one pair of antennas such that each antenna of the plurality of antennas is included in at least one antenna pair. The system also includes: a receiver in operable communication with the plurality of antennas and configured to receive the GNSS satellite signals therefrom. The receiver is configured to: compute single- or double-difference phases corresponding to one or more GNSS satellites for each of the at least one pair of antennas, construct a single Differential Carrier Phase Attitude DCPA equation based on constraints from the known relative geometries of each of the pairs of antennas, and determine a solution for the DCPA equation based on a cost function, the solution yielding at least one integer ambiguity value and the at least one attitude angle.

Further disclosed herein in an exemplary embodiment is a system for determining at least one attitude angle of a rigid body. The system comprising: means for receiving a plurality of Global Navigation Satellite System (GNSS) satellite signals with a plurality of antennas; means for establishing at least one pair of antennas such that each antenna of the plurality of antennas is included in at least one antenna pair; and means for computing single- or double-difference phases corresponding to one or more GNSS satellites for each of the pairs of antennas. The system also includes means for constructing a single Differential Carrier Phase Attitude (DCPA) equation based on known geometry constraints of each of the pairs of antennas; and means for determining a solution for the DCPA equation based a cost function, the solution yielding at least one integer ambiguity value and the at least one attitude angle.

Also disclosed herein in yet another exemplary embodiment is a storage medium encoded with a machine readable computer program code, the code including instructions for causing a computer to implement the above-mentioned method for determining at least one attitude angle of a rigid body.

Further, in yet another exemplary embodiment, there is disclosed herein a computer data signal, the computer data signal comprising instructions for causing a computer to implement the above-mentioned method for determining at least one attitude angle of a rigid body.

Additional features, functions, and advantages associated with the disclosed methodology will be apparent from the detailed description which follows, particularly when reviewed in conjunction with the figures appended hereto.

BRIEF DESCRIPTION OF THE FIGURES

To assist those of ordinary skill in the art in making and using the disclosed embodiments, reference is made to the appended figures, wherein like references are generally numbered alike in the several figures:

FIG. 4A depicts geometry considerations related to the invention specifically, the vectors from a satellite to two antennas comprising a baseline pair are shown;

FIG. 4B depicts geometry at a scale consistent with the use of the present invention where the distance to the satellite is significantly far as compared to the antenna baseline;

FIG. 5A shows a rigid body upon which antennas are attached, these antennas having a fixed geometric relationship to one another and in particular having baseline vectors that are known with respect to a body-fixed coordinate system;

FIG. 5B shows the rigid body of FIG. 5A that is free to move so that its attitude varies with respect to an earth-fixed coordinate system and further shows that this attitude defined by three angles;

FIG. 8A is a figure showing the advantages of an exemplary methodology as disclosed herein to determine integer ambiguities, in this instance, with one antenna pair and one associated baseline;

FIG. 8B is a figure showing the advantages of an exemplary methodology as disclosed herein to determine integer ambiguities, in this instance, two antenna pairs and two associated baselines are shown;

FIG. 9A depicts an example of the problems associated with ambiguity fronts that nearly intersect and the possibility of a false solution;

FIG. 9B shows that by fully accounting for geometry constraints the problem of near intersections may be avoided;

DETAILED DESCRIPTION

An exemplary embodiment of invention features a method and system for attitude determination that is effective and completely exploits geometry constraints of the antennas attached to a rigid body, and does so with measurements from all antennas processed simultaneously and optimally. This occurs both during the solution of the ambiguities, and during normal operation of the attitude device. In contrast, the methods of prior art separate antennas into pairs, then solve single-difference or double-difference ambiguities for each pair independently. In one such method, geometry constraints are taken into account only after the ambiguities are solved to validate the results. In another method, the ambiguities are solved over an antenna pair of a substantially short baseline and the resulting solution is then used to narrow the search for ambiguities over another antenna pair of longer baseline.

A preferred embodiment of the invention, by way of illustration, is described herein as it may be applied to attitude determination of a rigid body with known geometry constraints. While a preferred embodiment is shown and described by illustration and reference to attitude determination, it will be appreciated by those skilled in the art that the invention is not limited to attitude determination alone, and may be applied to attitude determination, control systems, navigation and the like.

It will further be appreciated that, while particular sensors, antennas, receivers and the like nomenclature associated therewith are enumerated to describe an exemplary embodiment, such terminology is utilized and described for illustration only and are not limiting. Numerous variations, substitutes, and equivalents will be apparent to those contemplating the disclosure herein.

Figure 1:
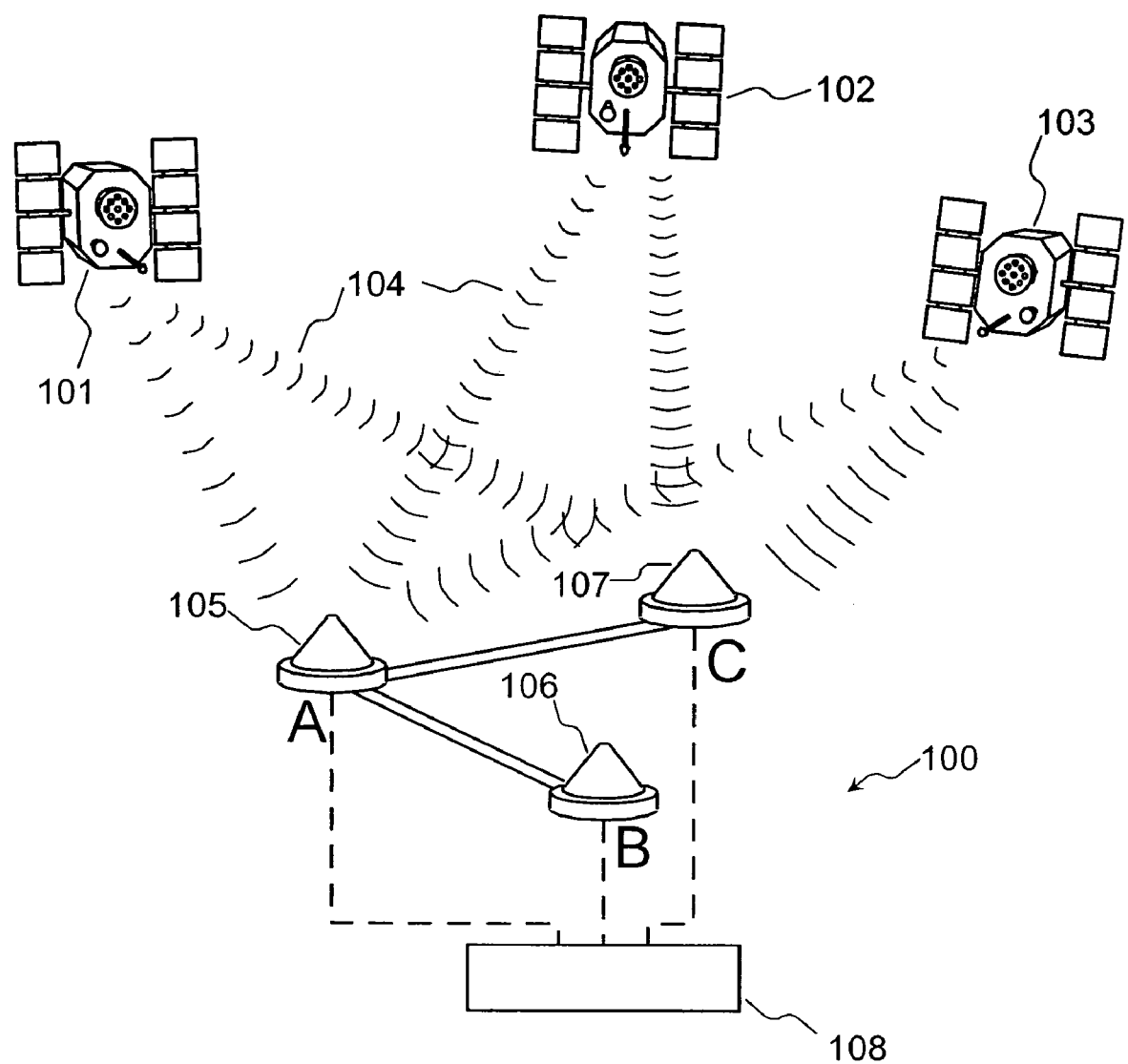
FIG. 1 is a diagram showing the use of GNSS satellites in an attitude determining system.

FIG. 1 depicts an exemplary embodiment of an attitude determining system 100 tracking a plurality of GNSS satellites, 101 through 103. The attitude determining hardware system 100 includes the use of three antennas to receive GNSS signals. Each satellite broadcasts a radio frequency signal 104 that is picked up by two or more antennas, three of which are shown as 105 through 107 in FIG. 1. The signal then travels from each antenna into the receiver unit 108 where it is down-converted and digitally sampled so that it may be tracked by the receiver's digital tracking loops. Various timing and navigation information is readily extracted while tracking the signal, including the phase of a Pseudo Random Noise (PRN) code timing pattern that is modulated on the signal, the phase of the signal's carrier, and navigation data from which the location of the satellite may be computed. It will be appreciated that while three antennas are depicted, more could be employed if desired, especially for redundancy.

In order to perform the prescribed functions and desired processing, as well as the computations therefore (e.g., the attitude determination processes, and the like), the receiver 108 may include, but not be limited to, a processor(s), computer(s), memory, storage, register(s), timing, interrupt (s), communication interface(s), and input/output signal interfaces, and the like, as well as combinations comprising at least one of the foregoing. For example, receiver 108 may include signal interfaces to enable accurate down-conversion and digitally sampling and tracking of satellite signals as needed to facilitate extracting the various timing and navigation information, including, but not limited to, the phase of the PRN code timing pattern. Additional features of the system 100, receiver 108 and the like, are thoroughly discussed herein.

Figure 2:
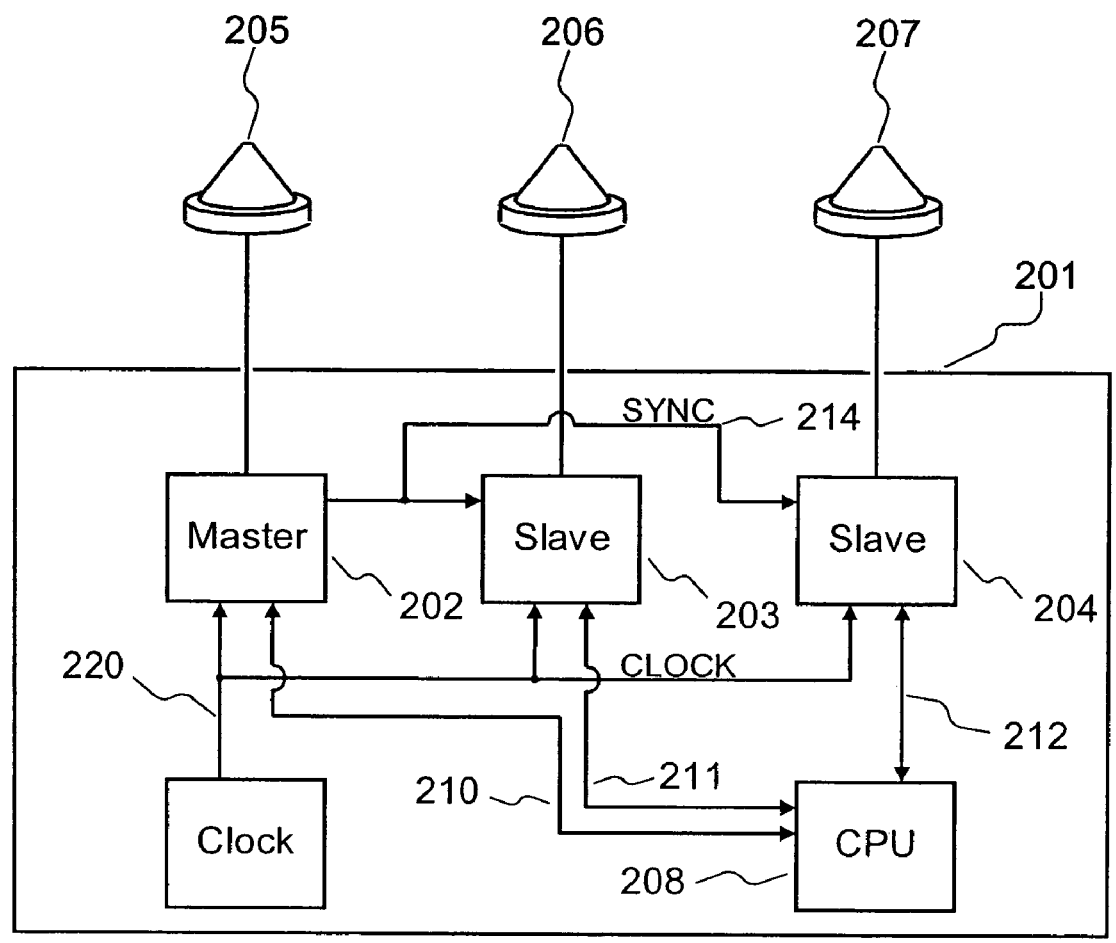
FIG. 2 is a schematic showing an attitude determining system embodiment of an exemplary embodiment of the present invention.

One exemplary embodiment of an attitude determining system 100 shown in FIG. 2 uses a single receiver unit 201 containing multiple synchronized tracking devices, 202 through 204, with each tracking device associated with exactly one antenna (205, 206, and 207). Each tracking device 202, 203, and 204 is capable of tracking a plurality of satellites e.g., 101, 102, and 103. Twelve or more satellites may be tracked. The tracking devices 202, 203, and 204 serve the function of down converting the received Radio Frequency (RF) signals 104 arriving from the plurality of satellites e.g., 101, 102, and 103, sampling the composite signal, and performing high-speed digital processing on the composite signal (such as correlations with a PRN reference signal) that allow the code and carrier phase of each satellite to be tracked. An example of such a synchronized tracking devices 202, 203, and 204 are described in commonly assigned U.S. patent application Ser. No. 11/029,809 entitled Method and System for Synchronizing Multiple Tracking Devices For A Geo-location System, filed Jan. 5, 2005, which is a continuation-in-part of U.S. patent application Ser. No. 10/828,745 entitled Method And System For Satellite Based Phase Measurements For Relative Positioning of Fixed Or Slow Moving Points in Close Proximity, filed Apr. 21, 2004, the contents of which are incorporated by reference herein in their entirety. Each tracking device, e.g., 202, 203, and 204 is connected to a single shared computer processing unit (CPU) 208. The CPU 208 sends control commands 210, 211, and 212 respectively to the plurality of tracking devices 202, 203, and 204 that enable them to track the various GNSS satellites e.g., 101, 102, and 103. The CPU 208 receives back from the tracking device code and carrier phase measurements of the various satellite signals.

A synchronization signal 214, denoted as sync, sent by the master tracking device 202 to the slave tracking devices, 203 and 204 allows the master tracking device 202 and slave tracking devices 203, 204 to measure the code and carrier phase of each satellite signal 104 simultaneously. Furthermore, the RF down conversion within each tracking device 202, 203, and 204 and the sampling of data by each device is done using a common clock signal, 220. When a single-difference phase observation is formed by subtracting the carrier (or code) phase measured by one tracking device with that measured by another tracking device for the same satellite, the portion of the phase due to the receiver's clock error is essentially eliminated in the difference. Thereafter, all that remains of the single-difference clock error is a small, nearly constant bias that is due to different effective RF path lengths (possibly resulting from different cable lengths, slightly different filter group-delays, and the like). Consequently, the clock error may be estimated infrequently compared to other more important quantities such as heading, pitch, or roll. During the times that the clock error is not estimated the attitude device can produce an output using one fewer satellite than a system that must continually estimate clock error. Or, if a Kalman filter is utilized, the process noise for the clock state may be lowered substantially allowing the Kalman filter to strengthen its estimate of the other states such as the angles of attitude. Finally, cycle slips are easier to detect since clock jumps can be ruled out.

Referring again to FIG. 1, selected pairs of antennas are grouped together so that differences in phases (or differential phases) of signals received by each of the two antennas of the pair may be computed. For example, in FIG. 1, the pairs AB, AC and BC are possible combinations of antenna pairs from which to compute differential phases.

Figure 3:
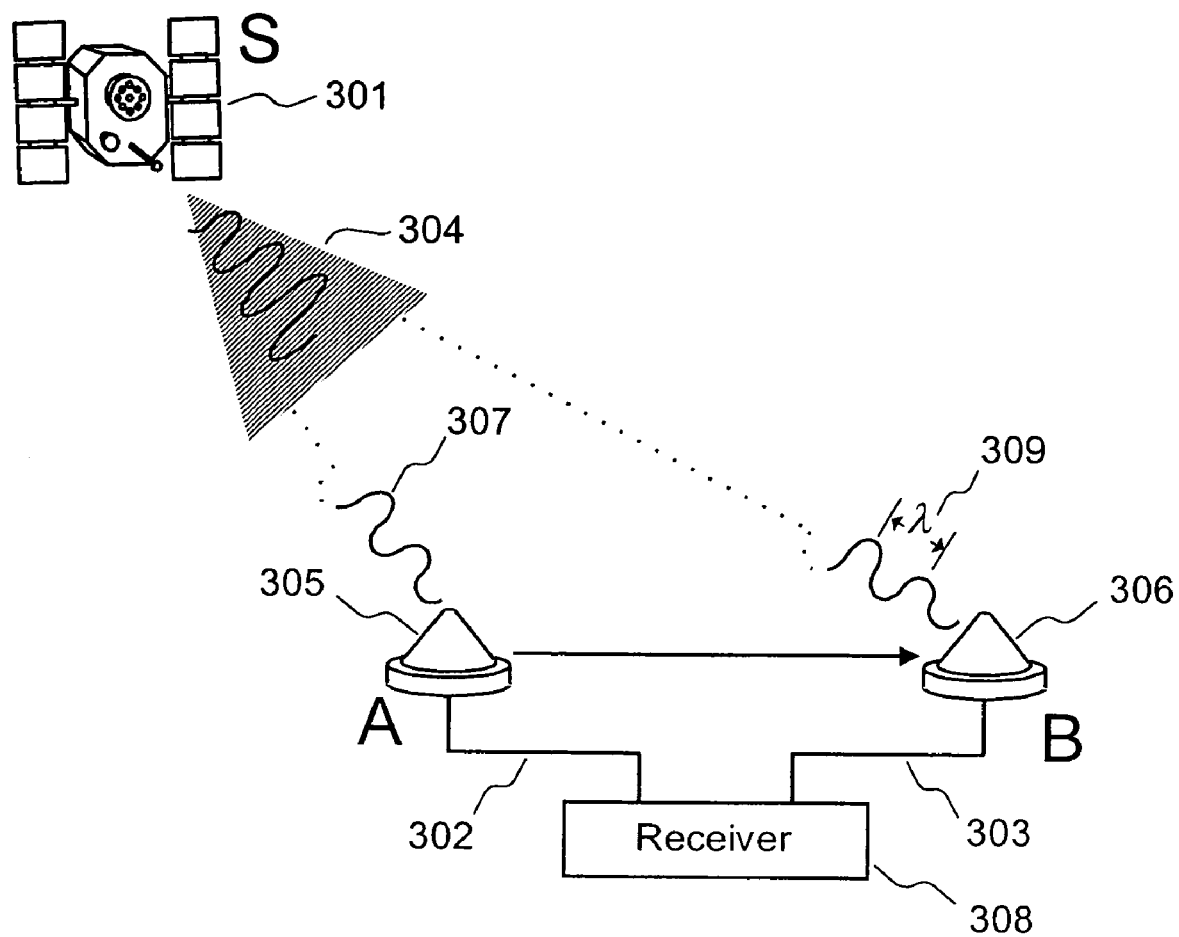
FIG. 3 depicts the reception of signals containing a carrier phase component by two antennas where this signal is then routed from each antenna to a receiver unit.

Turning now to FIG. 3 as well, another exemplary embodiment of the system 100 is depicted where a single antenna pair, again denoted AB, using the two antennas 305 and 306. These antennas 305, 306 are each shown receiving a common signal 304 from the GNSS satellite 301. The signal 304 received at each antenna is routed via cables 302 and 303 to the receiver unit 308 where it is tracked by the tracking device associated with the particular antenna 305, 306. Code and carrier phase measurements of the signal 304 are made at regular intervals. Of particular importance to this invention is the phase of the signal's carrier, 307, which is related to the range to the satellite by the carrier's wavelength λ, 309. The range to the satellite 301 may be expressed in terms of the number of carrier wavelengths, λ 309, that will divide it. For GPS satellites, λ is approximately 19 cm for the L1 carrier and 24 cm for the L2 carrier. The tracking loops within the receiver 308 typically track the carrier phase to an accuracy of less than three percent of the carrier's wavelength. This equates to 5 mm or less when tracking the L1 carrier signal from GPS.

Considering FIGS. 4A and FIG. 4B, geometric considerations relating to the various exemplary embodiments of the invention are depicted diagrammatically. Points A and B are the locations of two antennas. A vector, 402, from satellite 401 to an antenna located at point A is denoted $\vec{R}_{SA}$. Another vector, 403, from satellite 401 to an antenna at point B is denoted by $\vec{R}_{SB}$. A third vector $\vec{R}_{AB}$, 404, is shown along the line segment AB joining points A and B. Any vector, such as $\vec{R}_{AB}$, that joins two antennas will be termed a baseline vector. For the purpose of illustration, in FIG. 4A, the baseline vector, $\vec{R}_{AB}$, is shown significantly large relative to the distance to the satellite 401. FIG. 4B depicts a scenario that is more diagrammatically accurate, where the satellite 401 is significantly far away relative to the length of $\vec{R}_{AB}$ so that $\vec{R}_{SA}$ and $\vec{R}_{SB}$ appear essentially parallel.

Mathematically, the following equation holds for either FIG. 4A or FIG. 4B.

$$\vec{R}_{SB} = \vec{R}_{SA} + \vec{R}_{AB}$$

The geometric distance from a satellite S to an antenna A is the magnitude of the vector $\vec{R}_{SA}$ and this magnitude, denoted $\vec{R}_{SA}$, can be computed with a dot product as $$R_{SA} = \|\vec{R}_{SA}\| = \vec{R}_{SA} \cdot \vec{U}_{SA}$$

Where $\vec{U}_{SA}$ is a unit vector in the direction of the vector $\vec{R}_{SA}$. That is $$\vec{U}_{SA} = \begin{bmatrix} u_x \\ u_y \\ u_z \end{bmatrix} = (1/R_{SA}) \begin{bmatrix} r_x \\ r_y \\ r_z \end{bmatrix}$$

where $$R_{SA} = \|\vec{R}_{SA}\| = \sqrt{r_x^2 + r_y^2 + r_z^2} \text{ and } \vec{R}_{SA} = \begin{bmatrix} r_x \\ r_y \\ r_z \end{bmatrix}$$

Again, referring to FIG. 4A, equation for the magnitude of $\vec{R}_{SB}$ may be written as $$R_{SB} = \|\vec{R}_{SB}\| = (\vec{R}_{SA} + \vec{R}_{AB}) \cdot \vec{U}_{SB}$$

where $\vec{R}_{AB}$ is the baseline vector from point A to point B.

In FIG. 4B, $\vec{R}_{SA}$ is nearly parallel to $\vec{R}_{SB}$ due to the antennas being relatively close as compared to the distances to the satellites. This near parallelism means that for all practical purposes, the unit vectors associated with $\vec{R}_{SA}$ and $\vec{R}_{SB}$ are nearly equal. The subscript A and B in the unit vectors $\vec{U}_{SA}$ and $\vec{U}_{SB}$ is thus dropped, allowing the use of the notation $$\vec{U}_S = \vec{U}_{SA} = \vec{U}_{SB}$$

It may then be shown that $$R_{SB} - R_{SA} = \vec{R}_{AB} \cdot \vec{U}_S$$

The range $R_{SA}$ from satellite S to point A may be expressed in terms of the carrier phase $\phi_{SA}$. This carrier phase is measured by the tracking device associated with an antenna at point A and is related to $\vec{R}_{SA}$ by the following equation.

$$\phi_{SA} = R_{SA} + Clk_A - Clk_S + Atmos + N_{SA} + Noise$$

where each of the terms in the above equation are preferably expressed in units of carrier cycles and these terms are:

$\phi_{SA}$=The carrier phase measured by tracking device A for satellite S.
$R_{SA}$=Geometric range from satellite S to antenna A.
$Clk_A$=The clock error associated with tracking device A.
$Clk_S$=The clock error associated with satellite S
Atmos=Change in carrier phase due to atmospheric effects, in particular the advance in carrier phase caused by its propagation through the ionosphere and the delay in carrier phase caused by its propagation through the troposphere.
$N_{SA}$=An integer ambiguity that arises because the receiver can track the carrier phase, but cannot tell which cycle of the carrier that it is tracking.
Noise=Error in phase due to receiver and multipath noise.

A similar equation can be written for the carrier phase $\phi_{SB}$ that is measured by the tracking device connected to antenna B and receiving a signal from satellite S. Since the two antennas are near to each other, the atmospheric effect on the carrier phase, Atmos, is essentially the same for both $\phi_{SA}$ and $\phi_{SB}$. Ignoring noise, the difference between the two phases is thus:

$$\phi_{SB} - \phi_{SA} = R_{SB} - R_{SA} + Clk_B - Clk_A + N_{SB} - N_{SA}$$

or $$\phi_{SAB} = R_{SB} - R_{SA} + Clk_{AB} + N_{SAB}.$$

The definitions $\phi_{SAB} = \phi_{SB} - \phi_{SA}$, $N_{SAB} = N_{SB} - N_{SA}$ and $Clk_{AB} = Clk_B - Clk_A$ have been made not only to simply the equation, but also because it is these differential quantities, rather than their individual constituents, that are beneficial to the methods outlined herein for the exemplary embodiments. It is noteworthy to appreciate that the ambiguity difference, $N_{SAB}$, is still an integer since it is the difference between two integers.

Using the relationship $R_{SB} - R_{SA} = \vec{R}_{AB} \cdot \vec{U}_S$ the differential phase measurement may be expressed in terms of the baseline vector, $\vec{R}_{AB}$, that extends from point A to point B.

$$\phi_{SAB} = \vec{R}_{AB} \cdot \vec{U}_S + Clk_{AB} + N_{SAB}$$

The above equation is termed a "single-difference" equation. It is an equation that is used extensively in the attitude determining process. Similar single-difference equations hold for each satellite whose signal it received at antennas A and B and tracked by the receiver. Furthermore, "double-difference" equations that effectively eliminate the clock term $Clk_{AB}$ are also readily derived. For example, if the subscript S is replaced with a number representing the particular satellite, then for satellite #1 and satellite #2 the differential phase equations may be written as:

$$\phi_{1AB} = \vec{R}_{AB} \cdot \vec{U}_1 + Clk_{AB} + N_{1AB}$$

and $$\phi_{2AB} = \vec{R}_{AB} \cdot \vec{U}_2 + Clk_{AB} + N_{2AB}$$

Subtracting the equation for satellite 2 from the equation for satellite 1 yields a "double-difference" equation:

$$\phi_{1AB} - \phi_{2AB} = \vec{R}_{AB} \cdot (\vec{U}_1 - \vec{U}_2) + (N_{1AB} - N_{2AB})$$

or $$\phi_{1AB} - \phi_{2AB} = \vec{R}_{AB} \cdot \vec{W}_{12} + N_{12AB}$$

where the vector $\vec{W}_{12} = (\vec{U}_1 - \vec{U}_2)$ is no longer a unit vector, but the double-difference ambiguity $N_{12AB} = (N_{1AB} - N_{2AB})$ is still an integer and the clock term $Clk_{AB}$ is gone. For compactness, the following notation is introduced for the double difference phase involving two satellites designated as satellites 'i' and 'j'.

$$\phi_{AB}^{ij} = \phi_{iAB} - \phi_{jAB}$$

Hence:

$$\phi_{AB}^{12} = \vec{R}_{AB} \cdot \vec{W}_{12} + N_{12AB}$$

Continuing now with FIG. 5A, three antennas 505 through 507 are depicted attached to a rigid body 500 of which the attitude is desired. Two baseline vectors denoted 504 and 503 are shown, both originating at antenna A, with one ending at antenna B and the other at antenna C respectively. The vectors are thus also fixed to the rigid-body and are denoted as $\vec{R}_{AB}^{Body}$ and $\vec{R}_{AC}^{Body}$ where the superscript "Body" signifies that the vectors are expressed in terms of a body-fixed coordinate system, denoted by reference numeral 501. The attitude (or angular orientation) of the body-fixed coordinate system 501 can vary with respect to an earth-fixed coordinate system, shown in the figure as 508. Preferably, and without loss of generality, it is convenient to treat the earth-fixed coordinates as aligned so that x-axis points north, the y-axis points east, and the z-axis points down.

The attitude of the rigid-body 500 is completely specified by three angles of heading (sometimes also called yaw), pitch, and roll. These angles are labeled in FIG. 5B as 520, 521, and 522 respectively. For the purpose of the derivations here, it is assumed that the rigid body is first rotated about a vertical axis by a heading angle $\Psi$, then about a horizontal axis by the pitch angle $\theta$, and finally about the resulting x-axis through a roll angle of $\phi$. This assumption is completely general since any possible orientation can be achieved by this sequence of rotations.

A purpose of the attitude determining system 100 is to compute $\Psi, \theta$, and $\phi$. Although two baseline vectors have been shown in FIG. 5A, the methods of this patent apply to one baseline vector (a two antenna attitude device) or any number of baseline vectors. If only one baseline vector is utilized, the attitude system 100 will compute only two of the three angles of $\Psi, \theta$, and $\phi$—typically only $\Psi$ and $\theta$.

The baseline vectors may be expressed in an earth-fixed coordinate system 508 by using matrix transformations that are well understood in the art. These may be written as:

$$\vec{R}_{AB} = [T(\Psi,\theta,\phi)]\vec{R}_{AB}^{Body}$$

$$\vec{R}_{AC} = [T(\Psi,\theta,\phi)]\vec{R}_{AC}^{Body}.$$

Here $[T(\Psi,\theta,\phi)]$ is a 3×3 matrix transforming baseline vectors that are expressed in a body-fixed coordinates, such as $\vec{R}_{AB}^{Body}$ or $\vec{R}_{AC}^{Body}$, into an earth-fixed coordinate system. In earth-fixed coordinates, the superscript 'Body' is dropped from the notation and thus $\vec{R}_{AB}$ and $\vec{R}_{AC}$ are the earth-fixed representation of $\vec{R}_{AB}^{Body}$ and $\vec{R}_{AC}^{Body}$. The matrix $[T(\Psi,\theta,\phi)]$ can be computed as $$[T(\psi,\theta,\phi)] = \begin{bmatrix} \cos(\psi) & -\sin(\psi) & 0 \\ \sin(\psi) & \cos(\psi) & 0 \\ 0 & 0 & 1 \end{bmatrix} \begin{bmatrix} \cos(\theta) & 0 & \sin(\theta) \\ 0 & 1 & 0 \\ -\sin(\theta) & 0 & \cos(\theta) \end{bmatrix}$$

$$\begin{bmatrix} 1 & 0 & 0 \\ 0 & \cos(\phi) & -\sin(\phi) \\ 0 & \sin(\phi) & \cos(\phi) \end{bmatrix}$$

Using what has been developed so far, the following double-difference equation for satellites i and j can be written with respect to the baseline vector from A to B.

$$\phi_{AB}^{ij} = \vec{W}_{ij}[T(\Psi,\theta,\phi)]\vec{R}_{AB}^{Body} + N_{ijAB}$$

Similarly, for the baseline vector from A to C, the following double-difference equation holds $$\phi_{AC}^{ij} = \vec{W}_{ij}[T(\Psi,\theta,\phi)]\vec{R}_{AC}^{Body} + N_{ijAC}$$

Let 'M' specify the number of double-difference phase observations available for the antenna pair AB and let $\vec{\phi}_{AB}$ be a vector comprising these M double-difference phase observations. Also, let $[W_{AB}]$ denote a 3×M matrix with rows made up of the individual $\vec{W}_{ij}$ vectors associated with each double-difference phase observation contained within $\vec{\phi}_{AB}$, and let $\vec{N}_{AB}$ be the vector of M double-difference ambiguities for $\vec{\phi}_{AB}$. Similarly, for the vector pair AC, define the double-difference phase vector $\vec{\phi}_{AC}$, an ambiguity vector $\vec{N}_{AC}$, and a matrix $[W_{AC}]$. We note that $[W_{AB}]$ and $[W_{AC}]$ likely have rows in common since each depends only on the satellites chosen to form the double-difference observations and does not depend on baseline geometry.

Double-difference equations for baselines AB and AC can be represented in matrix form as:

$$\begin{bmatrix} \vec{\varphi}_{AB} \\ \vec{\varphi}_{AC} \end{bmatrix} = \begin{bmatrix} [W_{AB}] & 0 \\ 0 & [W_{AC}] \end{bmatrix} \begin{bmatrix} [T(\psi,\theta,\phi)] & 0 \\ 0 & [T(\psi,\theta,\phi)] \end{bmatrix} \begin{bmatrix} \vec{R}_{AB}^{Body} \\ \vec{R}_{AC}^{Body} \end{bmatrix} + \begin{bmatrix} \vec{N}_{AB} \\ \vec{N}_{AC} \end{bmatrix}$$

For an arbitrary number of antenna baselines, the above equation can be written more compactly and more generally as:

$$\vec{\phi} = [W_d \| T_d(\Psi,\theta,\phi)]\vec{V} + \vec{N}$$

This equation shall be termed the Differential Carrier Phase Attitude (DCPA) equation. In the DCPA equation, $\vec{\phi}$ is a vector that includes all double-difference carrier phase measurements taken across all baseline vectors, $[W_d]$ is a corresponding block-diagonal matrix consisting of blocks such as $[W_{AB}]$ and $[W_{AC}]$, $[T_d(\Psi,\theta,\phi)]$ is a block-diagonal set of rotation matrices, (where each block is the exact same 3×3 matrix, $[T(\Psi,\theta,\phi)]$), $\vec{V}$ is the concatenation of all body-fixed baseline vectors into a single column vector, and $\vec{N}$ is the double-difference ambiguities associated with $\vec{\phi}$.

At this point, it is worth mentioning that $\vec{\phi}$ is computed from measured carrier phases, $[W_d]$ is readily determined from the user's location and the broadcast satellite locations, and $\vec{V}$ is a set of vectors whose scalar values are known, constant, and depend on the geometric arrangement of antennas within the body-fixed coordinate system. What remains to be solved are the attitude angles $\Psi,\theta,\phi$ and the ambiguities $\vec{N}$.

Use of the DCPA equation is advantageous since it fully incorporates knowledge of geometry constraints relating to the arrangement of the antennas in order to minimize the number of unknown variables. This ultimately strengthens the solution of the equation. Regardless of the number of antenna baselines, the DCPA equation contains a maximum of three independent variables, $\Psi,\theta,\phi$ plus the ambiguities $\vec{N}$ (only two independent variables for a single baseline). Conversely, existing approaches treat each baseline separately, introducing unknown attitude angles (or differential positions) for each baseline, and then take antenna geometry into account after separately solving the individual baselines.

Although the DCPA equation was derived using double-difference phase observations, it is not difficult to reformulate the DCPA equation using single- rather than double-difference observations. When doing so, clock terms arise for each pair of baselines. Nevertheless, the clock terms may be solved in addition to $\Psi,\theta,\phi$ and the ambiguities $\vec{N}$. Or, the clock terms may be known in advance from past solutions.

The single-difference form of the DCPA equation is similar in structure to the double-difference form of the equation except that the differential phase vector $\vec{\phi}$ consists of single-difference phase observations. There are several other differences as well. For example, each 3×1 body-fixed vector comprising the vector $\vec{V}$ is appended with a clock term, and thus becomes a 4×1 vector. Furthermore, each rotation matrix block within $[T_d(\Psi,\theta,\phi)]$ is changed accordingly from 3×3 matrix to 4×4 matrix with the original 3×3 matrix in the upper left-hand corner and 1 in the lower right diagonal. For example, if the baseline is designated AB, the body-fixed vector for the single-difference DCPA equation takes the form:

$$\vec{R}_{AB}^{Body} = \begin{bmatrix} x_{AB} \\ y_{AB} \\ z_{AB} \\ Clk_{AB} \end{bmatrix}$$

and the rotation matrix becomes a 4×4 rotation matrix for single-difference DCPA equation:

$$\begin{bmatrix} [T(\psi,\theta,\phi)] & \vec{0} \\ \vec{0}^T & 1 \end{bmatrix}$$

where $\vec{0}$ is a 3×1 matrix of zeroes.

Finally, the rows of the individual block matrices, such as $[W_{AB}]$ are replaced with the unit vectors to the satellite from which the single-difference applies and a $4^{th}$ column is added that is filled with ones. For example, $[W_{AB}]$ would take a form such as:

$$[W_{AB}] = \begin{bmatrix} \vec{U}_1 & 1 \\ \vec{U}_2 & 1 \\ \ldots \\ \vec{U}_M & 1 \end{bmatrix}$$

where $\vec{U}_1$ through $\vec{U}_M$ are unit vectors.

Generally, it is preferable to use the single-difference form of the DCPA equation when the clock terms are already known. It is also preferable to use the single-difference form of the DCPA equation in situations that the clock terms might drift slowly and ambiguities are already known. Notably, the single-difference DCPA has one more independent phase observation available than does its double-difference counterpart since one independent observation is used up in the double-differencing. However, it is noteworthy to appreciate that when solving ambiguities without advanced knowledge of clock terms, the double-difference equation is generally preferred.

In order to fully exploit the power of the DCPA equation, the antenna baseline pairs are chosen so that each antenna is in at least one baseline pair. Use of redundant baseline pairs without increasing the number of antennas, while possible, is unlikely to yield added benefit. A redundant baseline pair is one whose baseline vector can be computed as the sum or difference of previously chosen baseline pairs. For example, with three antennas, such as shown in FIG. 1, there are three possible baseline pairs: AB, AC and BC. However, it should be noted that since $\vec{R}_{BC} = \vec{R}_{AC} - \vec{R}_{AB}$, only two baseline pairs will actually contain independent differential observations.

Figure 6:
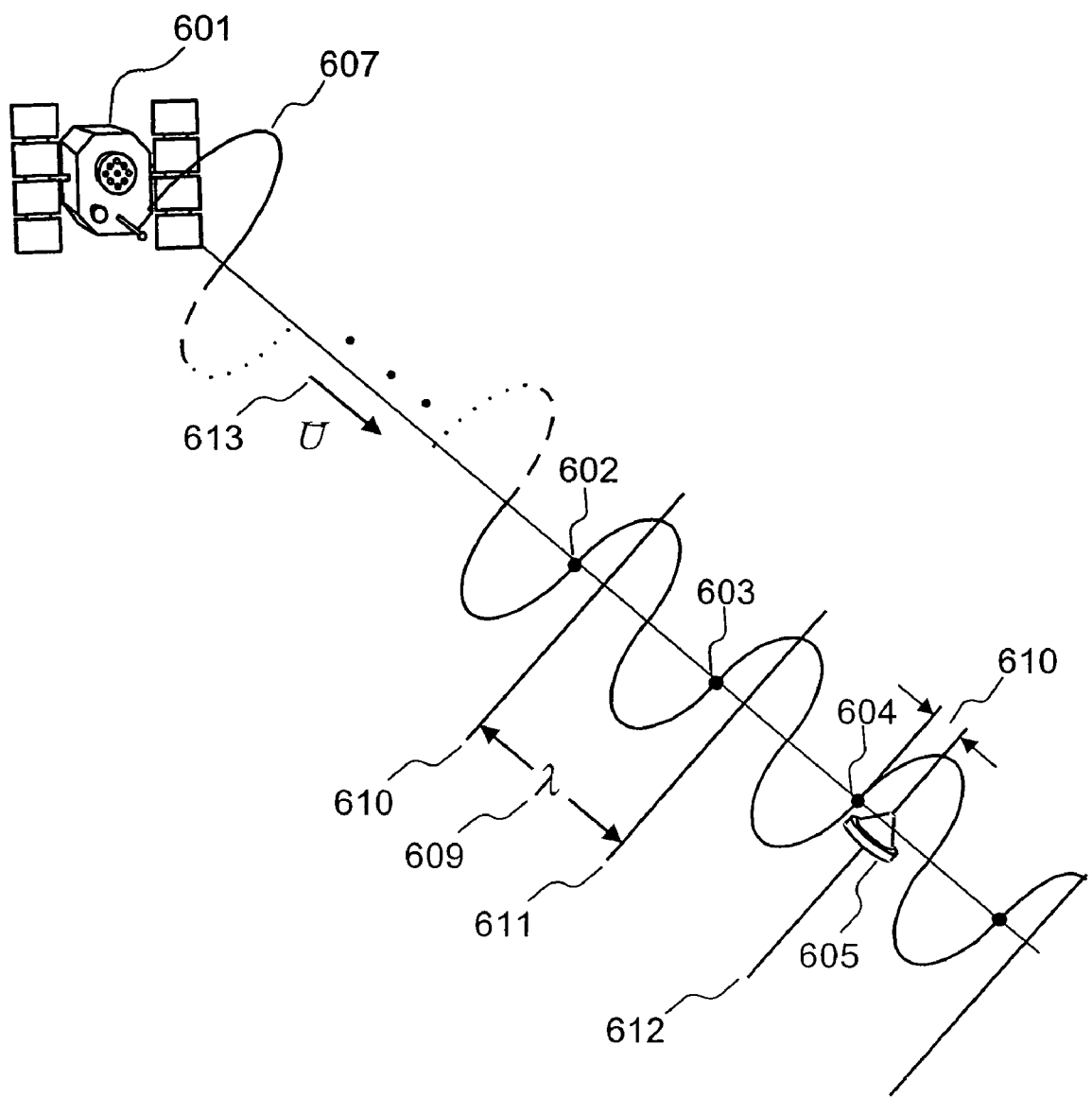
FIG. 6 is a schematic showing concepts related to the measurement of a satellite signal's carrier phase and in particular the integer cycle ambiguities and the associated ambiguity fronts that are present in the carrier phase.

Turning now to FIGS. 6 through 9 as well, the advantage of solving the ambiguities using the DCPA equation will become apparent. FIG. 6 shows the effect of integer ambiguities on a carrier phase measurement. A carrier signal 607 is transmitted from a satellite 601 where it arrives at antenna 605. A tracking device e.g. 202 within the receiver e.g. 108 tracks and measures the phase of the carrier signal. The phase consists of a fractional part 610 and an integer part. The integer part is ambiguous in that the receiver 108 cannot measure directly the true integer value, i.e., the integer number of cycles between the satellite 601 and antenna 605. Points 602, 603, and 604 show several possible carrier phase readings having only an integer value. The receiver 108 measures the fractional phase 610, but will initially have the incorrect integer portion. The combined integer and fractional phase can therefore reside anywhere along lines 610, 611, or 612, which are separated by one wavelength 609 of the carrier. The lines are perpendicular to the directional vector 613 which points from the satellite 601 to the antenna 605. These lines are henceforth termed "ambiguity fronts". The ambiguity fronts 610, 611, or 612 are separated by one carrier wavelength 609.

Figure 7:
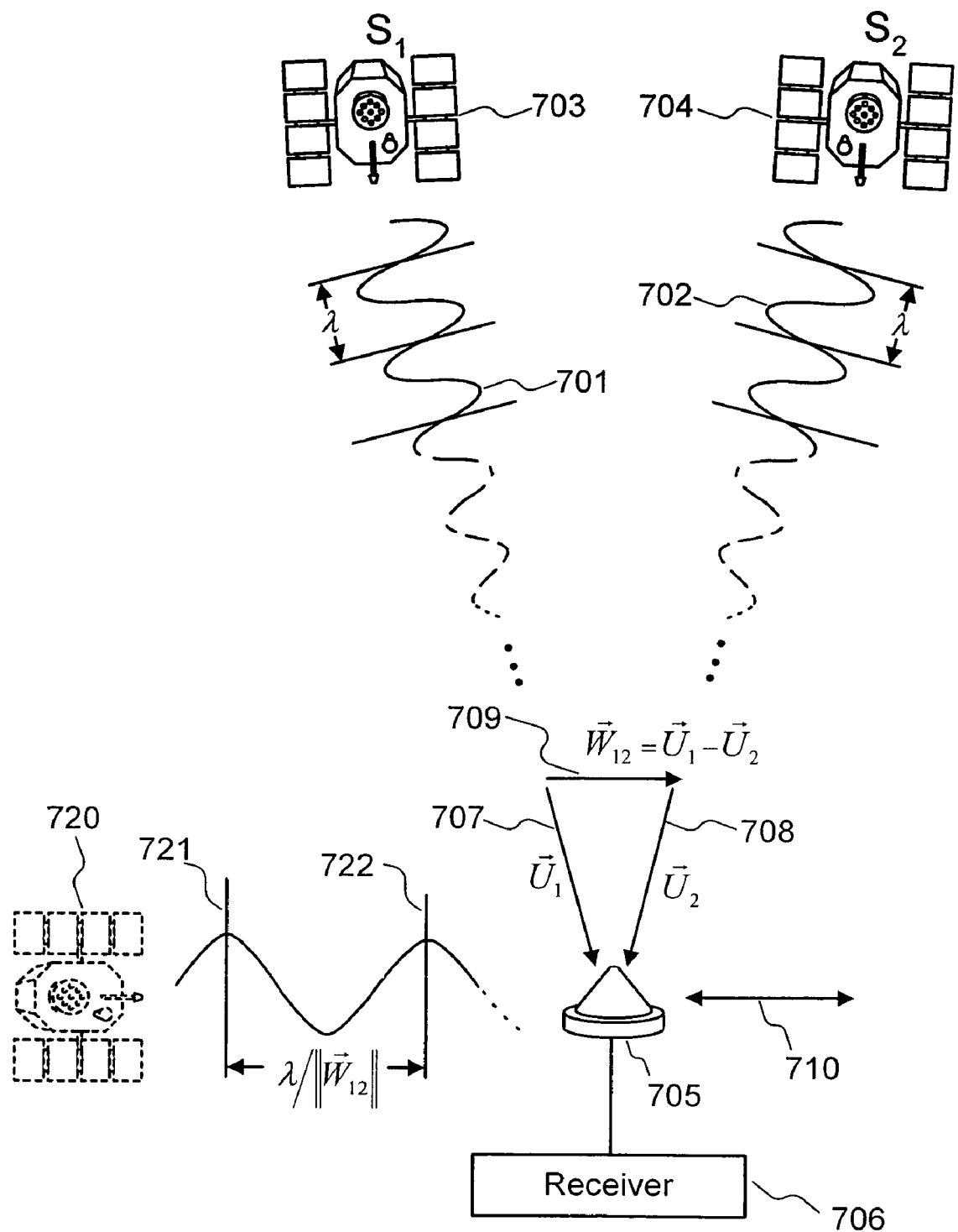
FIG. 7 provides a visualization of the methods that are employed and the resulting geometry that arises when using double-difference carrier phase measurements.

Turning now to FIG. 7 as well a diagram to visualize ambiguity fronts when phase observations are double-differenced is provided. Carrier signals, denoted here as 701 and 702 originating at satellites $S_1$ and $S_2$ (703 and 704) arrive at an antenna 705. The phase of each carrier signal is measured by receiver, 706, attached to the antenna and the double-difference phase observation is computed. Unit vectors $\vec{U}_1$ and $\vec{U}_2$ (707 and 708) are also computed such that $\vec{U}_1$ points from satellite $S_1$ to the antenna and $\vec{U}_2$ points from the satellite $S_2$ to the antenna. In accordance with double-difference techniques, the unit vectors are themselves differenced. This forms a non-unit vector 709

$$\vec{W}_{12} = \vec{U}_1 - \vec{U}_2$$

Changes in the antenna location 705 appear as a change in the double-difference phase to the extent that the change in location is along a line 710 that is parallel to $\vec{W}_{12}$. More precisely, the dot product of the antenna's displacement with $\vec{W}_{12}$ directly shows up in the double-difference phase. In the reverse sense, an integer change in the double-difference phase will appear as a displacement of the antenna along the line 710. The displacement will be proportional to the carrier wavelength, $\lambda$, and inversely proportional to the magnitude of $\vec{W}_{12}$. For the sake of analysis and visualization, it is therefore advantageous to imagine that a satellite 720 exists at a location along the line 710 and that it is broadcasting a carrier signal of wavelength $\lambda/\|\vec{W}_{12}\|$. Double-difference ambiguity fronts, 721 and 722, are shown accordingly and are separated by a distance of $\lambda/\|\vec{W}_{12}\|$. It is evident that an integer change in the double-difference carrier phase will cause an apparent change in the antenna location and this location will reside on one of the ambiguity fronts shown.

FIGS. 8A, 8B are exemplary figures showing the advantage of using the DCPA equation to determine ambiguities. For the purpose of illustration, the clock term is not considered and it may be assumed that either the double-difference form of the DCPA equation is used, or that the clock terms are already known and the single-difference form is used.

FIG. 8A shows ambiguity fronts 801 and 802. An antenna 803 is located at the center of a circle 810 and a second antenna 804 is constrained to spin freely about the first antenna. This constraint takes the form of an arm 805 to which both antennas are attached. The arm acts as the rigid body and the angle 806 defines the angle of this rigid body with respect to an earth-fixed coordinate axis 807. Without the constraint of the arm, a solution for the location of antenna 804 results in a point that could lie at the intersection of any two ambiguity fronts, for example it could lie at 809. However, the DCPA equation advantageously takes the geometry constraint of the arm into account. Hence, the solution of this equation constrains the antenna 804 to lie on the circle 810. Notably, it will be appreciated that the only intersections of ambiguity front crossing that lies on the circle is located at 808. The ambiguities associated with this crossing along with the angle 806 are therefore uniquely determined when the DCPA equation is solved.

In FIG. 8B, antennas 821 and 822 are shown to rotate about a third antenna 823. Also shown are two line segments 824 and 825 designating the baselines for antenna pairs (823,821) and (823,822), respectively. All three antennas are held fixed relative to one another and are thus constrained geometrically such that: 1) antennas 821 and 822 lie on the circle 830 and 2) baseline segments 824 and 825 are of a fixed distance and are separated by the constant angle 831. Furthermore, a heading angle 832 is defined for the baseline segment 824 and this angle is measured relative to an earth-fixed axis 833. Ambiguity fronts for antenna 821 intersect at multiple points, two of which lie on the circle 830. Point 827 is evidently the correct location based on the geometric constraints, while 841 is a false location. In this situation, the single baseline pair of antennas (823, 821), if used alone, would not be sufficient to determine the correct ambiguities and correct heading 832.

The antenna pair (823,822) with baseline 825 also has only one intersection 828 of ambiguity fronts that lies on the circle. The intersection 842 is not on the circle as it was in the case of antenna pair (823, 821). Thus, the correct set of ambiguities and heading can be uniquely determined for the antenna pair (823,822). Furthermore, when solving the DCPA equation for both pairs of antennas simultaneously, all sets of ambiguities along with the heading angle 832 are uniquely determined. The combination of geometrical constraints, such as the fixed angle 831 and fixed baselines 824 and 825 along with a finite number of ambiguity front intersections dictates exactly one solution to the DCPA equation.

FIG. 9A expands the problem further to show three sets of ambiguity fronts. In a two dimensional situation, as depicted in FIG. 9A, three sets of ambiguity fronts can uniquely determine the correct location of a point without added geometry constraints. The correct point, 901, is point where three fronts exactly intersect. Another point 902, however, may have a near intersection, and noise within the carrier phase observations may lead to the near intersection being chosen over the correct point 901. The spatial distribution of such near intersections is typically sparse, and consequently, they will occur in only a small number of places in the vicinity of the true location 901. Furthermore, they occur at points that maintain a fixed geometrical relationship to the true point 901. If the true point moves, the near intersection 902 moves with it.

FIG. 9B is identical to FIG. 8B, however, another set of ambiguity fronts, 950 and 951, have been added. There are thus three sets of ambiguity fronts that correspond to the double-difference equations for both baselines 924 and 925. Ambiguity fronts move relative to antenna location and thus the fronts are distributed similarly relative to points 927 and 928 upon which antennas 921 and 922 are situated. If the point 941 is a near intersection for the three ambiguity fronts for the antenna 921, then the point 942 will be a near intersection for ambiguity fronts for the antenna 922. This is because points 941 and 942 lie at a similar offset and orientation relative to the true antenna locations 927 and 928, respectively. The near intersection 941 lies on the circle, but the likelihood that its near intersection counterpart, 942, lies on the circle is small due to the relatively sparse distribution of such intersections. This is indeed the case, and the intersection 942 is seen to be relatively far from the circle.

It is noteworthy to appreciate that statistically, the odds that the location of a near intersection will also satisfy geometry constraints diminishes as the number near intersections diminishes. And the number of intersections that can be considered "near" generally diminishes as the number of ambiguity fronts increase. Each added differential carrier phase measurement yields an added ambiguity front. Furthermore, while it is evident that three antennas is sufficient for a 3D solution, increasing the number of antennas also helps with ambiguity determinations since associated with each added baseline is another set of ambiguity fronts and another opportunity to insure that false intersections and geometry do not coincide.

Mathematically the DCPA equation provides a means to measure both the nearness of ambiguity front intersections and the degree to which these intersections satisfy geometry constraints. Its solution insures that both factors are taken into account. And since all independent baselines are simultaneously incorporated into the DCPA equation, all available information is used consistently and to its fullest extent.

One method to solve the DCPA equation for both the ambiguities $\vec{N}$ and the angles $\Psi, \theta$, and $\phi$ is to minimize a cost function that effectively characterizes the degree to which the ambiguity fronts intersect one another and the degree to which they lie on the constraining geometry. Usually, this involves a search of potential candidates of the ambiguity vector $\vec{N}$ followed by a least-squares solution of the DCPA equation for each candidate. In the least-squares solution, the angles $\Psi, \theta$, and $\phi$ are determined that minimize the cost function C where $$C = E^T Q E$$

Here, E is defined as the error vector associated with the solution of the DCPA equation. That is:

$$E = \vec{\phi} - [W_d \| T_d(\Psi, \theta, \phi)] \vec{V} + \vec{N}.$$

The matrix Q is a weighting matrix that allows measurements to be weighted based on factors such as the noise levels that are expected within the single- or double-difference phase measurements. Noisy measurements are given less weight than non-noisy measurements. In practice, this noise is often a function of satellite elevation or signal-to-noise ratios.

The DCPA equation is nonlinear in $\Psi, \theta$, and $\phi$. Consequently a least-squares solution typically requires that the equation first be linearized about a nominal point and then solved by successive iterations involving new nominal points and new linearizations about the new nominal points.

The set of ambiguities that results in a global minimization of the cost function C is chosen as the correct set of ambiguities. That is, the set of all candidate ambiguity vectors $\vec{N}$ are searched and $\Psi, \theta$, and $\phi$ are determined that minimize C for each candidate $\vec{N}$. The candidate that results in the lowest value for C is taken as the correct candidate.

Figure 10A:
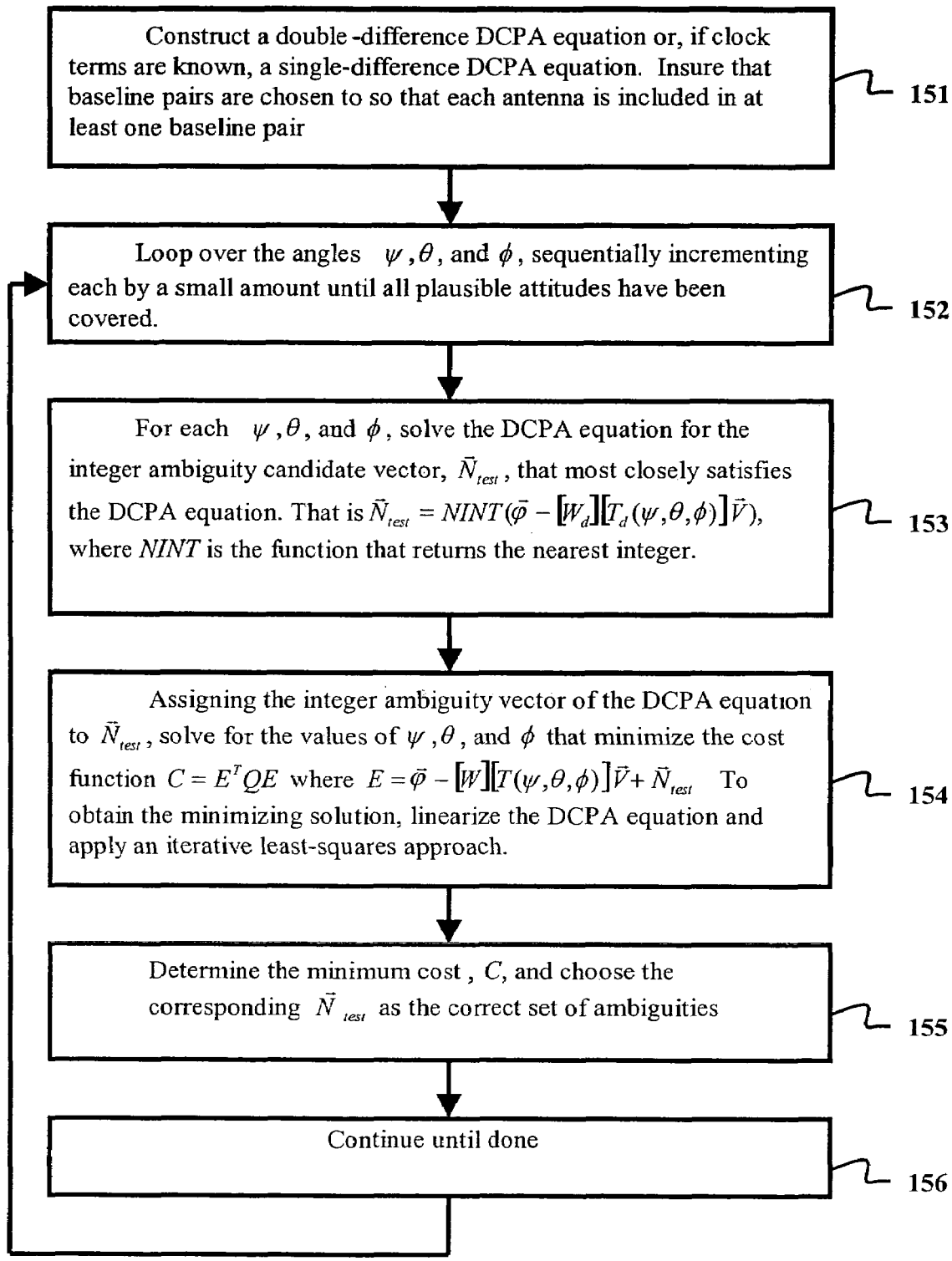
FIG. 10A is a flow chart showing a method to determine ambiguities that is used in an exemplary embodiment of the present invention where the search space is over the angles.
Figure 10B:
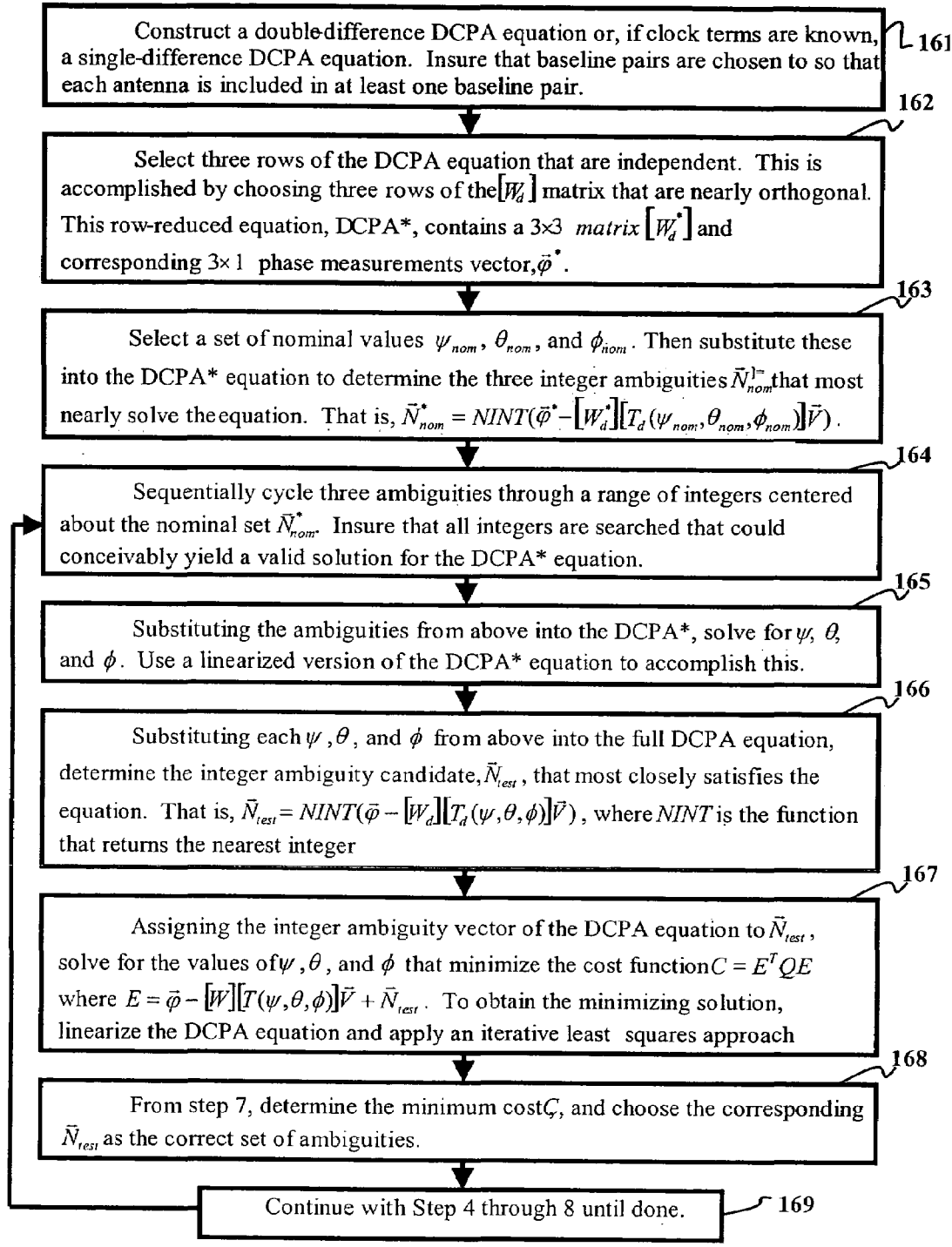
FIG. 10B is a flow chart showing a method to determine ambiguities that is used in an exemplary embodiment of the present invention where the search space is over the ambiguities.

Turning now to FIGS. 10A and 10B, a flow chart is provided depicting the process comprising two methodologies of searching for and selecting the best set of integer ambiguities. The methodology of FIG. 10A performs a search over the attitude angles $\Psi, \theta$, and $\phi$ to determine ambiguity candidates that are nearest to the search angles while the method of FIG. 10B directly searches a minimum set of ambiguity candidates and then, using a location derived from this set of ambiguities, computes all remaining ambiguity candidates. One who is skilled in the art would readily appreciate that other search techniques are conceivable.

Both FIGS. 10A and 10B include a one-time design, denoted by reference numerals 151 and 161 respectively, in which the DCPA equation is determined and implemented in computer logic. The methods disclosed above are used to derive the DCPA equation that is specific to the particular attitude device. Standard techniques for implementing algorithms in software are then deployed.

FIG. 10A shows processes labeled 152 through 156 that are executed, preferably sequentially within a recursive loop by a computer during run-time. The methodology is a recursive process, with each process repeated until all plausible angles $\Psi, \theta$, and $\phi$ have been searched. The completion of the loop results in an ambiguity set and angles targeted to minimize a cost function. In an exemplary embodiment, the cost function is depicted at process block labeled as 154 in the figure. A method for determining a potential ambiguity solution is shown at process block labeled 153 in the figure. Potential ambiguity solutions are evaluated as depicted at process blocks 154 and 155 respectively to determine the one solution that minimizes the cost function. Looping over angles $\Psi, \theta$, and $\phi$ is controlled as depicted at process block 152. Angles that are unrealistic, or have been ruled out due to readings from other instruments, such as magnetic or tilt sensors, are not searched.

FIG. 10B shows a methodology labeled 164 through 169 that are executed by a computer during run-time to perform a search over ambiguity values. That is, rather than looping over the angles $\Psi, \theta$, and $\phi$, the methodology of FIG. 10B loops over the individual ambiguities comprising $\vec{N}$. More precisely, as shown in at process block 162 in the figure, only three ambiguities need to be varied and these are varied about a nominal ambiguity set as defined process block 162. A row-reduced DCPA equation arises that when solved, yields a value of $\Psi, \theta$, and $\phi$ as shown process block 165. Continuing with process block 166, an ambiguity vector containing all unknown ambiguities (rather than just three) is computed and this is taken as a contender for the correct ambiguity vector. Evaluation of the ambiguity contender occurs at process blocks 167 and 168 to see if it yields a minimum to a cost function based on the least-squares solution of the DCPA equation. Once again, the methodology is a recursive process, with each process repeated until all conceivable ambiguity values have been considered. Conceivable ambiguity values are those that are consistent with geometrical constraints, particularly the separation between antennas. It is noteworthy to appreciate that the figure also includes a processes denoted 162 and 163, that are executed only once per ambiguity search to initialize the ambiguity search center. These steps do not add significant computational overhead since they are not part of the main loop.

It will also be appreciated that the process for searching over ambiguity values as depicted in FIG. 10B involves more processes than the methodology of searching over the angles $\Psi, \theta$, and $\phi$, as depicted in FIG. 10A, but may require less computational overhead. For example, it may be noted that the process of FIG. 10A employs a loop over $\Psi, \theta$, and $\phi$ which sequentially increments each angle by a small amount. The amount by which the angles are incremented should be selected to be small enough to insure that no ambiguity candidate is missed. In an exemplary embodiment, the incremental search angle is selected to be about one half of the carrier's wavelength divided by the longest antenna baseline. As a consequence of this added insurance, some ambiguity sets are typically considered more than once. Furthermore, the incremental search angles can be quite small, requiring a high number of loop cycles to cover all conceivable attitudes. In contrast, the search conducted as depicted in FIG. 10B is conducted using three ambiguities that are cycled sequentially through a range of integer values. Each resulting set of three integer values is then used to exactly solve for $\Psi, \theta$, and $\phi$ which are then associated with exactly one ambiguity candidate set. While this approach may be initially more complex, it is likely to involve fewer loop cycles than the approach of FIG. 10A since it avoids repeated searches of the same ambiguity set.

Figure 11:
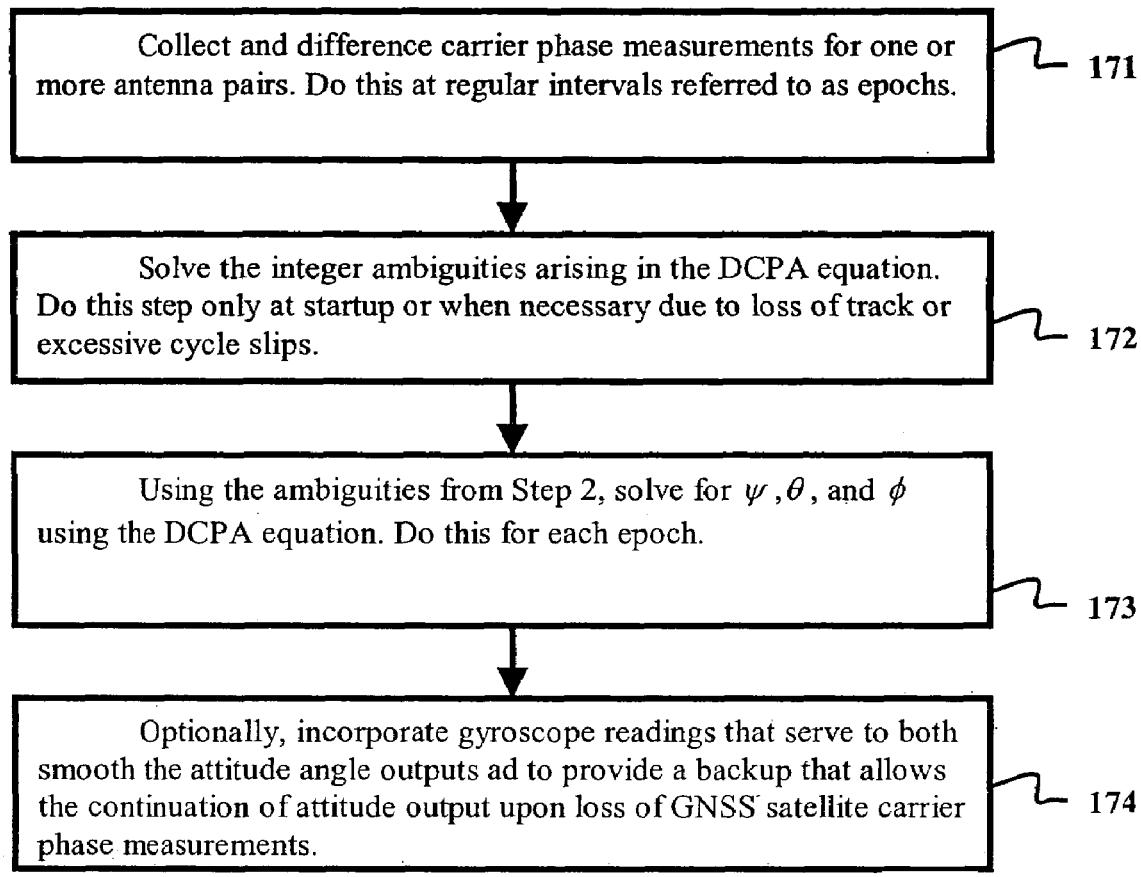
FIG. 11 is a flow chart depicting an exemplary process for determining an attitude solution.

Turning now to FIG. 11, a process is depicted for determining orientation angles such as yaw, pitch and roll that are output by the attitude device 100. Collection of phase measurements is conducted at regular time intervals known as epochs as depicted at process block 171. For example, epochs may occur every $\frac{1}{20}^{th}$ of a second.

Process block 172 depicts the solution of the integer ambiguities, was described in greater detail in FIG. 10. This occurs once at startup and every time there is a significant loss of tracked satellites, or excessive cycle slips. Otherwise, once the ambiguities are determined, there is no need to conduct this process further.

The system progresses to process block 173, once integer ambiguities are determined, $\Psi, \theta$, and $\phi$ are computed by solving the DCPA equation while using the previously determined ambiguities. If only one vector pair is utilized, only two of the three angles $\Psi, \theta$, and $\phi$ can be computed. Solution for $\Psi, \theta$, and $\phi$ is relatively straight forward and in one embodiment involves a standard least-squares method for simultaneously solving a set of linear equations as well as standard techniques from calculus for linearizing sets of nonlinear equations. In another exemplary embodiment, a Kalman filter may be employed as an alternative to the least-squares method; the advantage being that a Kalman filter can produce a solution that optimally utilizes knowledge of both measurement noise statistics and anticipated dynamics (e.g., maximum angular accelerations) of the attitude device.

Continuing with FIG. 11, a process block 174, an optional process involving the incorporation of gyroscope readings is depicted. It has the advantage of producing smoother angular outputs than are produced with GNSS carrier phase readings alone. This is especially true when antennas are separated by short baselines. In one embodiment, the gyroscopes readings are processed along with the differential carrier phase observations using a Kalman filter. An advantage to this approach is that it is easier to detect and repair cycle slips in the carrier phase readings since the gyroscope provides redundant information to the Kalman filter that greatly improves its ability to detect outliers in the measurements. Another advantage is that when GPS signals are blocked due to obstructions, the gyroscope readings provide the Kalman filter with information that enables it to continue outputting one or more of the angles $\Psi, \theta$, and $\phi$. This is known as "coasting". Depending on the quality of the gyroscopes used, the attitude system can coast for several minutes to many hours. The Kalman filter is designed to estimate bias errors and scale errors in the gyroscope readings, and then remove these sources of errors from the gyro measurements. As such, even low quality gyroscopes typically allow coasting for several minutes at a time with a properly designed Kalman filter.

It will be evident that there exist numerous numerical methodologies in the art for implementation of mathematical functions, in particular as referenced here, linearizations, least squares approximations, filters, Kalman filters, taking maximums, and summations. While many possible implementations exist, a particular method of implementation as employed to illustrate the exemplary embodiments should not be considered limiting.

The system and methodology described in the numerous embodiments hereinbefore provides a system and methods of attitude determination that is effective and completely exploits geometry constraints of the antennas attached to a rigid body, and does so with measurements from all antennas processed simultaneously and optimally. This occurs both during the solution of the ambiguities and during normal operation of the attitude device. In addition, the disclosed invention may be embodied in the form of computer-implemented processes and apparatuses for practicing those processes. The present invention can also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or as data signal transmitted whether a modulated carrier wave or not, over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

It will be appreciated that the use of "first" and "second" or other similar nomenclature for denoting similar items is not intended to specify or imply any particular order unless otherwise specifically stated. Likewise the use of "a" or "an" or other similar nomenclature is intended to mean "one or more" unless otherwise specifically stated.

While the invention has been described with reference to an exemplary embodiment thereof, it will be understood by those skilled in the art that the present disclosure is not limited to such exemplary embodiments and that various changes may be made and equivalents may be substituted for elements thereof without departing from the scope of the invention. In addition, a variety of modifications, enhancements, and/or variations may be made to adapt a particular situation or material to the teachings of the invention without departing from the essential spirit or scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A system for determining at least one attitude angle of a rigid body comprising:

a plurality of antennas disposed on the rigid body, said plurality of antennas exhibiting known relative geometries and receptive to a plurality of Global Navigation Satellite System (GNSS) satellite signals, said plurality of antennas partitioned into at least one baseline pair of antennas exhibiting a known physical geometry such that each antenna of said plurality of antennas is included in at least one antenna pair;

a receiver in operable communication with said plurality of antennas and configured to receive said GNSS satellite signals therefrom; said receiver configured to;

a) compute single- or double-difference carrier phases corresponding to one or more GNSS satellites for each of said at least one pair of antennas,
b) construct a single Differential Carrier Phase Attitude (DCPA) equation based on constraints from said known relative geometries of each of said pairs of antennas,
c) loop over and sequentially increment at least one coarse attitude angle,
d) solve for an integer ambiguity vector that minimizes a residual error vector E when said coarse angle is substituted into the DCPA equation,
e) for each integer ambiguity vector of step d) determine at least one refined attitude angle that minimizes a least-squares cost function with a cost function based upon the DCPA equation, and
f) repeat steps c-e and save to computer memory any ambiguity vector that results in the cost function having a value that is less than a previous cost function value.

2. The system of claim 1 wherein said plurality of antennas includes at least three antennas.

3. The system of claim 1 wherein the at least one attitude angle corresponds to at least one of heading, pitch, or roll angles.

4. The system of claim 1 wherein said cost function is based on at least one of a degree to which selected ambiguity fronts intersect or a degree to which said selected ambiguity fronts correspond to said known geometry constraints.

5. The system of claim 1 wherein said solution is achieved employing at least one of a least-squares method or a Kalman filter.

6. The system of claim 1 further including a gyroscope configured to provide attitudes processed along with the differential carrier phase observations to enhance said solution.

7. The system of claim 1 further including a gyroscope configured to provide attitudes to a Kalman filter, wherein said Kalman filter is configured to estimate bias errors and scale errors in said attitudes from said gyroscope, and then reduce or remove these errors from said attitudes from said gyroscope.

8. A system for determining at least one attitude angle of a rigid body comprising:
 a plurality of antennas disposed on the rigid body, said plurality of antennas exhibiting known relative geometries and receptive to a plurality of Global Navigation Satellite System (GNSS) satellite signals, said plurality of antennas partitioned into at least one baseline pair of antennas exhibiting a known physical geometry such that each antenna of said plurality of antennas is included in at least one antenna pair;
 a receiver in operable communication with said plurality of antennas and configured to receive said GNSS satellite signals therefrom; said receiver being configured to;
 a) compute singe- or double-difference carrier phases corresponding to one or more GNSS satellites for each of said at least one pair of antennas,
 b) construct a Differential Carrier Phase Attitude (DCPA) equation based on constraints from said known relative geometries of each of said pairs of antennas,
 c) select a subset of integer ambiguities containing at least one integer ambiguity, but not containing the entire set of integer ambiguities,
 d) loop over and sequentially increment at least one integer corresponding to at least one ambiguity of the subset,
 e) using at least one of said incremented integer ambiguities, solve for at least one coarse attitude angle,
 f) solve for an integer ambiguity vector that minimizes the residual error vector E when said coarse angle is substituted into the DCPA equation,
 g) for each integer ambiguity vector of step f) determine at least one refined attitude angle that minimizes a least-squares cost function with said cost function based upon the DCPA equation, and
 h) repeat steps c-g, and save to computer memory any ambiguity vector that results in the cost function having a value that is less than a previous cost function value.

* * * * *